United States Patent [19]
Echtler

[11] Patent Number: 5,239,438
[45] Date of Patent: Aug. 24, 1993

[54] FAULT CURRENT PROTECTIVE DEVICE

[75] Inventor: Karl Echtler, Puchheim, Fed. Rep. of Germany

[73] Assignee: Hilti Aktiengesellschaft, Furstentum Liechtenstein, Liechtenstein

[21] Appl. No.: 678,694

[22] Filed: Apr. 1, 1991

[30] Foreign Application Priority Data

Mar. 31, 1990 [DE] Fed. Rep. of Germany ....... 4010424

[51] Int. Cl.$^5$ ............................................. H02H 3/16
[52] U.S. Cl. ......................................... 361/44; 361/63
[58] Field of Search .................... 361/44, 45, 435, 352, 361/57, 58, 93, 102, 46, 49, 42, 63

[56] References Cited
U.S. PATENT DOCUMENTS 3,895,263  7/1975  Clark ..................................... 361/46
4,685,022  8/1987  Nichols, III et al. .................. 361/44

FOREIGN PATENT DOCUMENTS 3431581  3/1986  Fed. Rep. of Germany .

Primary Examiner—Steven L. Stephan
Assistant Examiner—Ed To
Attorney, Agent, or Firm—Anderson Kill Olick & Oshinsky

[57] ABSTRACT

A fault current protective device contains a fault current protective switch (2) for the protection of at least two circuits formed by branching subsequent to the fault current protective switch (2) and having the same number of phases. One of these circuits is looped through the fault current protective switch (2) again at least once over connections (L2, L3, and L2', L3'), respectively, of the fault current protective switch (2) which are free of use, so that a higher protection level (lower nominal fault current $I_{\Delta n}$) is obtained relative to the other circuit. Only one fault current protective switch (2) is required for this purpose, so that the fault circuit protective device is compact and economical.

20 Claims, 1 Drawing Sheet

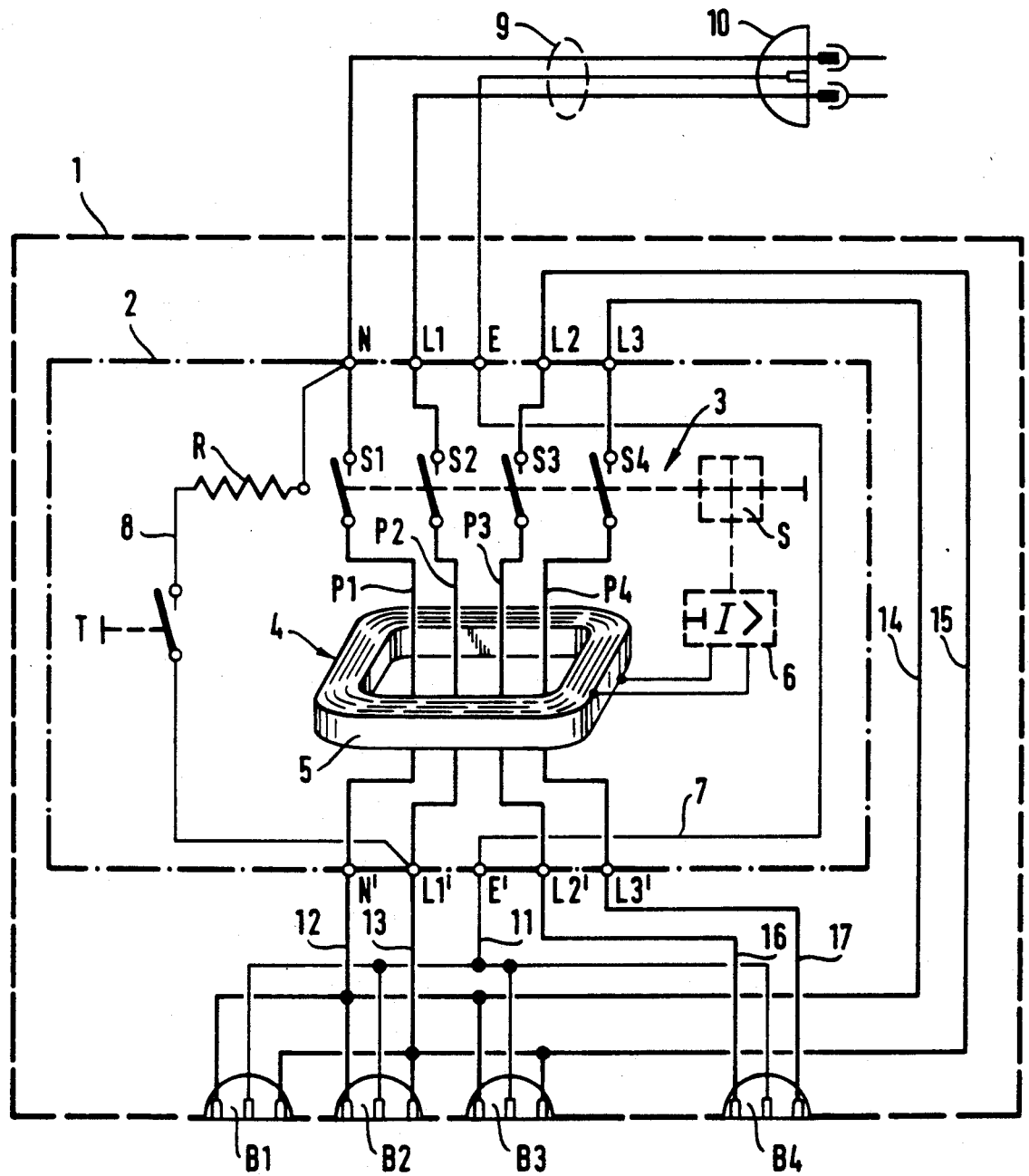

FAULT CURRENT PROTECTIVE DEVICE

BACKGROUND OF THE INVENTION

The present invention is directed to a fault or leakage current protective device including a fault current protective switch for the protection of at least two circuits provided by a branching arrangement subsequent to the fault current protective switch and having the same number of phases.

Such a fault current protective device is known in general and may have the form of a so-called plug socket construction. In addition to the fault current protective switch, the plug socket construction has a plurality of plug sockets, for instance, three to five, all protected by the fault current protective switch. There is no selectivity with respect to the individual circuits and plug sockets, so that all of the current flows are switched off when an insulation fault occurs in only one circuit. Moreover, there is no selectivity relative to the level of the threshold of a fault current triggering, so that it is always only the same fault current which leads to a triggering of fault current protective device for the purpose of switching off all circuits.

Another fault current protective device is disclosed in DE-34 31 581 A1, on which the fault current protective device discussed above is based, and in which each circuit is assigned its own fault current protective switch for monitoring a plurality of circuits. In this regard, reference is made to FIG. 12 of DE 34 31 581. A common fault current protective switch is connected ahead of the individual fault current protective switches for the respective circuits, with all of the fault current protective switches located in a single housing. As indicated in the claims in this patent, the fault current protective switches assigned to the individual circuits can also have nominal fault current triggerings of different levels.

SUMMARY OF THE INVENTION

Therefore, the primary object of the present invention is to develop further the fault current protective switch mentioned above so that it is also possible to provide different thresholds for a fault current triggering for the respective circuits without requiring additional fault current protective switches.

In accordance with the present invention, one of the circuits provided by a branching arrangement subsequent to the fault current protective switch is looped through the fault current protective switch again at least once via connections of the fault current protective switch not as yet occupied or free of use. By means of this feature, the threshold for the fault current triggering of the circuit, which is again looped through the fault current protective switch, can be reduced relative to that of the circuit which is guided through the fault current protective switch only once, according to the number of times it is looped through. If the fault current protective switch has a nominal fault current $I_{\Delta n}$ of 30 mA, this threshold is valid for the circuit looped only once through the summation transformer of the fault current protective switch. A nominal fault current $I_{\Delta n}$ of 15 mA is then provided for the circuit obtained by branching, which circuit is looped through the fault current protective switch or its summation transformer again. A further reduction of the nominal fault current can be achieved by looping the latter circuit through the fault current protective switch again.

In this manner, to obtain more than two circuits with different nominal fault currents or fault current triggerings, each circuit which is looped through the fault current protective switch again can be provided with taps subsequent to the fault current protective switch. A circuit looped through again, branches again subsequent to the fault current protective switch, so that one of the branches is again looped through the fault current protective switch through connections of the fault current protective switch which are not yet occupied or are free from use. A circuit formed in this manner with an original nominal fault current $I_{\Delta n}$ of 30 mA would thus have a nominal fault current $I_{\Delta n}$ of 10 mA.

These circuits can be single-phase, so that they have two leads, that is, one phase and one neutral conductor. Two circuits with different fault current triggerings can be formed by a four-pole fault current protective switch.

The circuits can also be three-phase with four leads, that is, three phases and one neutral conductor. An eight-pole fault current protective switch would be employed for forming two circuits with different fault current triggerings. Eight primary current branches or lines would then pass through the summation transformer. Further, the original triggering current of 30 mA would be decreased to 15 mA for the second circuit.

Such a decrease is particularly sensible if devices with different protection levels are to be connected with a FI (fault current) plug socket box. For instance, it could be used with an enclosed ventilated diamond drill motor with a required high protection level ($I_{\Delta n} = 15$ mA) and for less dangerous devices, such as enclosed pump motors, water suction devices or lamps. A lower protection level (such as $I_{\Delta n} = 30$ mA) is fully sufficient for the latter. If it is desired to provide the high protection level ($I_{\Delta n} = 15$ mA) for all of the consumers connected to the FI plug socket box, fault triggerings would occur relatively often if the less dangerous devices together reach this protection level. This not necessary, however, and is prevented by means of the fault current protective device of the present invention.

A particularly advantageous arrangement of the invention is distinguished in that the fault current protective device is formed as a four-pole protective switch. Accordingly, a first pair of protective switch output terminals for one circuit, assigned to a first pair of protective switch input terminals, is connected to a second pair of protective switch input terminals to which a second pair of protective switch output terminals for the other circuit is assigned. Both circuits are single-phase. Accordingly, two circuits with different triggering circuits can be formed, specifically by means of a commercially available fault current protective switch, so that the entire fault current protective device can be manufactured at relatively low cost.

The respective circuits can be divided into a plurality of parallel circuits at the output side which are not looped through the fault current protective switch a second time, so that the protection levels of the respective circuit is assigned to all parallel circuits.

For this purpose, the first pair of protective switch output terminals can be connected with one or more two-pole plug sockets electrically connected and parallel to one another, while the second pair of protective switch output terminals can also be connected with one or more two-pole plug sockets electrically connected and parallel to one another. The same arrangement also applies, in a corresponding manner, for three-phase circuits.

The fault current protective switch and the plug sockets can be arranged in a common housing, providing a compact construction of the fault current protective device.

The energy supply for the fault current protective device can be afforded via a cable connected with a plug-in connector, with the cable connected directly to the fault current protective device. The first pair of protective switch input terminals of the four-pole fault current protective switch can be connected through a two-pole cable with a two-pole plug-in connector. Of course, the required ground line is still present.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

The drawing is a schematic illustration of a fault current protective device, embodying the present invention.

DETAILED DESCRIPTION OF THE INVENTION

As shown in the drawing, the fault current protective device of the present invention includes an external housing 1 formed of a rigid plastics material. A commercially available fault current protective switch 2 with a nominal fault current $I_{\Delta n} = 30$ mA, is positioned in a fixed manner within the interior of the housing 1. Fault current protective switch 2 is formed with four-poles and, in addition to a ground connection terminal E,E' on the input and output sides, it has four-input terminals N, L1, L2, L3, as well as four output terminals N', L1', L2', L3' in a conventional manner. A switch with four switching contacts S1, S2, S3, S4, and a switching lock S for simultaneously opening and closing the switching contacts S1, S2, S3, S4 by a mechanical device, as well as a summation transformer 4 is located between the input terminals N, L1, L2, L3 and the output terminals N', L1', L2', L3'. On the primary side, the summation transformer 4 has four primary current branches P1, P2, P3, P4 surrounded by a secondary winding 5 which supplies a fault voltage for triggering a switching relay 6 when a fault current occurs. The switching relay 6 in turn mechanically actuates the switching lock S of the switch 3 for opening all switching contacts S1, S2, S3, S4. A ground line 7 extending between the ground connection terminals E, E' does not pass through the secondary winding 5. A test branch 8 has, in series connection, a test resistor R and a test switch T located between the input terminal N and the output L1'. When the test key for checking the operativeness of the fault current protective switch is actuated, it is triggered in the operating state, so that the switch 3 opens.

To supply the fault current protective device with energy the fault current protective switch 2 is connected on the input side with a cable 9, and a plug-in connector 10 is connected to the other end of the cable.

The plug-in connector 10 is a two-pole plug connector with a ground contact. The two-poles of the plug-in connector 10 are connected to the input terminals L1 and N over lead lines, while the ground contact of the plug-in connector is connected with the ground connection terminal E over another line lead. Means for protection against stress or tension, not shown, can serve for the mechanical fastening of the cable 9 at the housing 1. In the illustrated embodiment, the fault current protective device has four plug sockets B1, B2, B3, B4 at the output side and these sockets are two-pole with an additional ground contact. The connector sockets B1, B2, B3, B4 are integrated in the housing 1 in a fixed manner and are accessible from the outside.

The ground contacts of all connector sockets B1, B2, B3, B4 are connected with the ground connection terminal E' of the fault current protective switch at the output side via a common line 11. Further, a pole of the connector sockets B1, B2, B3 is connected in each instance with the output terminal N' of the fault current protective switch 2 over a line 12, while the other pole of the connector sockets B1, B2, B3 is connected with the output terminal L1' of the fault current protective switch 2 via a line 13. The connector sockets B1, B2, B3 thus form three parallel circuits protected in each instance with a relatively low threshold determined by a nominal fault current of $I_{\Delta n} = 30$ mA, for which the fault current protective switch was originally designed.

In addition, output terminal N' is connected with the input terminal L3 of the fault current protective switch 2 over the line 12 and a line 14, while the output terminal L1' is connected with the input terminal L2 of the fault current protective switch 2 by the line 13 and a line 15. The output terminal L2' is connected with a pole of the connector socket B4 by way of a line 16 and the output terminal L3' is connected with the other pole of connector socket B4 via a line 17. As a result, the circuit formed by the lines 14, 15, 16 and 17 passes through the summation transformer 4 again by way of the switching contacts S3, S4 and the primary branches P3, P4, so that the current flowing across the connector socket B4 ultimately passes through the summation transformer 4 twice. Therefore, a fault current flowing across the connector socket B4 need only be half as large as a fault current flowing across one of the connector sockets B1, B2, B3 to trigger the fault current protective switch 2, specifically because of the doubled number of turns due to the fact that the circuit provided for the connector socket B4 is looped again through the summation transformer. Therefore a higher protection level is assigned to the connector socket B4 corresponding to a still lower nominal fault current $I_{\Delta n} = 15$ mA. It is also possible to connect other circuits in parallel to the connector socket B4 so that they are protected with the higher protection level.

I claim:
1. Fault current protective device comprising:
a fault current protective switch for the protective of at least two circuits provided by branch lines located subsequently to the fault current protective switch and having the same number of phases, wherein the improvement comprises that one of the circuits is looped through the fault current protective switch (2) again at least once via connection of the fault current protective switch (2) free of use; and
one of the circuits looped again through branches subsequent to the fault current protective switch

(2) and one of the branches of the one of the circuits is looped through the fault current protective switch (2) again via connections of the fault current protective switch which are free of use.

2. Fault current protective device, as set forth in claim 1, wherein the circuits are single phase.

3. Fault current protective device, as set forth in claim 1, wherein the circuits are three-phase.

4. Fault current protective device, as set forth in claim 2, wherein the fault current protective switch (2) is a four-pole protective switch, a first pair of protective switch output terminals (N', L1') for one circuit is assigned to a first pair of protective switch input terminals (N, L1) connected to a second, pair of protective switch input terminals (L2, L3) with which a second pair of protective switch output terminals (L2', L3') for the other circuit is assigned.

5. Fault current protective device, as set forth in claim 4, wherein the first pair of protective switch input terminals (N, L1) is connected with a two-pole connector (10) through a cable (9).

6. Fault current protective device, as set forth in claim 4, wherein the first pair of protective switch output terminals (N', L1') is connected with at least one two-pole plug socket (B1, B2, B3) electrically connected and parallel with one another.

7. Fault current protective device, as set forth in claim 5, wherein the first pair of protective switch output terminals (N', L1') is connected with at least one two-pole plug socket (B1, B2, B3) electrically connected and parallel with one another.

8. Fault current protective device, as set forth in claim 4, wherein the second pair of protective switch output terminals (L2', L3') is connected with at least one two-pole plug socket (B4) electrically connected in parallel.

9. Fault current protective device, as set forth in claim 5, wherein the second pair of protective switch output terminals (L2', L3') is connected with at least one two-pole plug socket (B4) electrically connected in parallel.

10. Fault current protective device, as set forth in claim 6, wherein the second pair of protective switch output terminals (L2', L3') is connected with at least one two-pole plug socket (B4) electrically connected in parallel.

11. Fault current protective device, as set forth in claim 7, wherein the second pair of protective switch output terminals (L2', L3') is connected with at least one two-pole plug socket (B4) electrically connected in parallel.

12. Fault current protective device, as set forth in claim 6, wherein the fault current protective switch (2) and the plug sockets (B1, B2, B3, B4) are arranged in a common housing (1).

13. Fault current protective device, as set forth in claim 7, wherein the fault current protective switch (2) and the plug sockets (B1, B2, B3, B4) are arranged in a common housing (1).

14. Fault current protective device, as set forth in claim 8, wherein the fault current protective switch (2) and the plug sockets (B1, B2, B3, B4) are arranged in a common housing (1).

15. Fault current protective device, as set forth in claim 4, wherein the fault current protective switch (2) is set to a nominal fault current ($I_{\Delta n}$) in the milliampere range of 30 mA.

16. Fault current protective device, as set forth in claim 5, wherein the fault current protective switch (2) is set to a nominal fault current ($I_{\Delta n}$) in the milliampere range of 30 mA.

17. Fault current protective device, as set forth in claim 6, wherein the fault current protective switch (2) is set to a nominal fault current ($I_{\Delta n}$) in the milliampere range of 30 mA.

18. Fault current protective device, as set forth in claim 7, wherein the fault current protective switch (2) is set to a nominal fault current ($I_{\Delta n}$) in the milliampere range of 30 mA.

19. Fault current protective device, as set forth in claim 8, wherein the fault current protective switch (2) is set to a nominal fault current ($I_{\Delta n}$) in the milliampere range of 30 mA.

20. Fault current protective device, as set forth in claim 9, wherein the fault current protective switch (2) is set to a nominal fault current ($I_{\Delta n}$) in the milliampere range of 30 mA.

* * * * *